United States Patent
Gantz et al.

(10) Patent No.: US 6,479,802 B1
(45) Date of Patent: Nov. 12, 2002

(54) PROCESS AND APPARATUS FOR CONTACT-LESS TEMPERATURE REGULATIONS

(75) Inventors: Stefan Gantz, Neu-Anspach; Klaus Tzschaschel, Magdeburg; Christian Schiewe, Dresden, all of (DE)

(73) Assignee: IMPAC Electronic GmbH, Frankfurt am Main (DE)

( * ) Notice: Subject to any disclaimer, the term of this patent is extended or adjusted under 35 U.S.C. 154(b) by 0 days.

(21) Appl. No.: 09/697,093

(22) Filed: Oct. 26, 2000

(30) Foreign Application Priority Data

Oct. 28, 1999 (DE) .......................... 199 51 899

(51) Int. Cl.$^7$ ................................ H05B 1/02
(52) U.S. Cl. .................. 219/502; 219/497; 219/501; 374/121
(58) Field of Search ................ 219/497, 499, 219/501, 502, 505; 374/121–129; 307/117, 119

(56) References Cited

U.S. PATENT DOCUMENTS

| | | | | |
|---|---|---|---|---|
| 5,177,340 A | * | 1/1993 | Zaffiro | 219/494 |
| 5,635,409 A | * | 6/1997 | Moslehi | 438/7 |
| 5,961,314 A | * | 10/1999 | Myhre | 431/79 |
| 6,219,573 B1 | * | 4/2001 | Pompei | 600/674 |

* cited by examiner

*Primary Examiner*—Mark Paschall
(74) *Attorney, Agent, or Firm*—Michael L. Dunn

(57) ABSTRACT

The present invention concerns a process for contact-less temperature regulation, in which the temperature is measured in a contact-less mode with a temperature measurement device and detected as an analog value and then digitized, wherein moreover there is provided a digital regulator which outputs a control value in dependence on the detected temperature and predetermined regulating parameters and a corresponding apparatus. In order to provide a process and a corresponding apparatus for contact-less temperature regulation which can have extremely short response times and which at the same time have a relatively high degree of accuracy and parameterizability, it is proposed in accordance with the invention that the measurement data which are digitized by the electronic measurement system are processed in one and the same processor for the purposes of temperature determination and regulation, which is integrated into the electronic measurement system or the housing of the electronic measurement system, so that the raw data are used within the processor both for ascertaining the current temperature and also for calculating and producing a control value and thus the output of the electronic measurement system in the form of the regulator output directly supplies a control value for influencing the temperature to be regulated of an object.

20 Claims, 1 Drawing Sheet

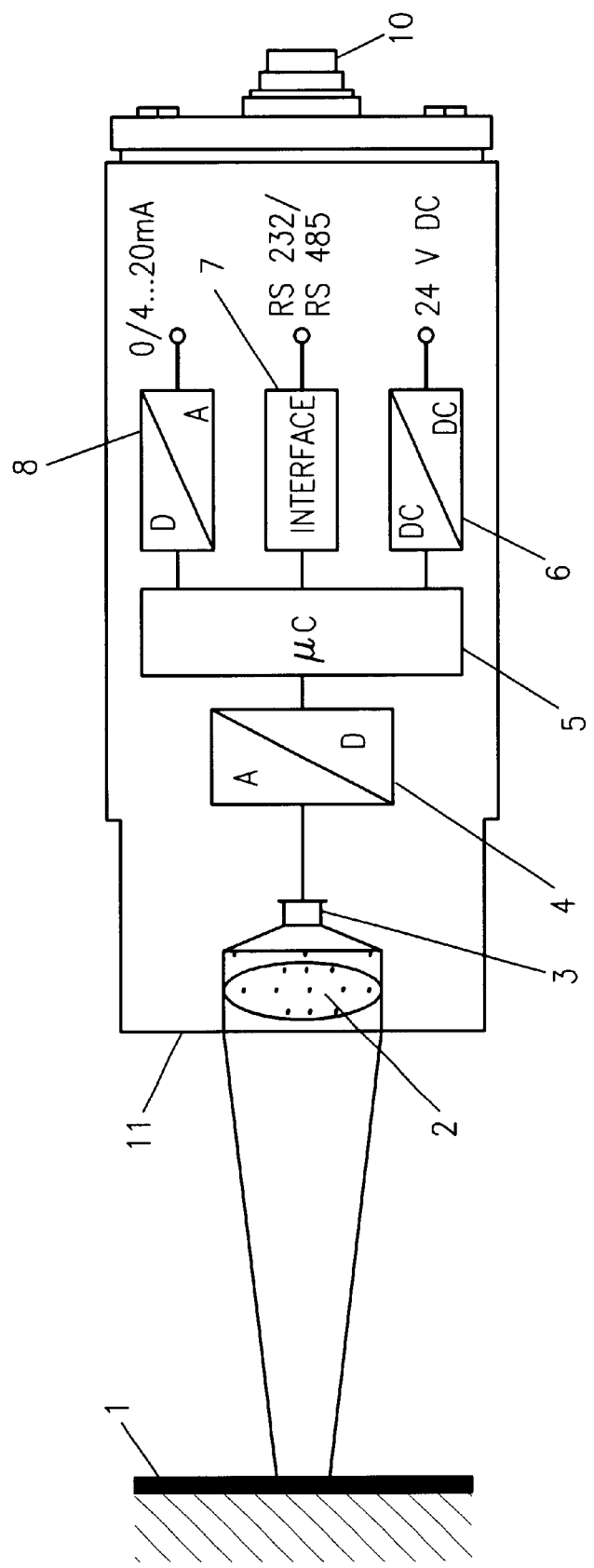

PROCESS AND APPARATUS FOR CONTACT-LESS TEMPERATURE REGULATIONS

BACKGROUND OF THE INVENTION

A) Field of the Invention

The present invention concerns a process for contact-less temperature regulation, wherein the temperature is detected in a contact-less mode as an analog value with a temperature measuring device and digitized and wherein moreover there is provided a digital regulator which processes the detected temperature and which outputs a control signal which is dependent on predetermined parameters and the measured temperature.

B) History of the Prior Art

Corresponding processes and apparatus have already long been known. In that respect, the devices used for contact-less temperature measurement are generally pyrometers which, in dependence on the intensity and possibly also the spectrum of a received thermal radiation, generate an analog voltage or current signal. That signal is admittedly a measurement in respect of the measured temperature, but radiation intensity and spectrum are also influenced by other objects, including the measurement device itself, the temperature of which is not to be measured.

For correction purposes, it is possible to implement both purely mechanical measures, such as for example for the purposes of screening radiation, as well as to execute electronic corrections which correct the measurement signal which is detected in the form of an analog voltage.

Furthermore it is already known for the detected analog measurement signal to be digitized and subjected to further processing in digitized form, in particular therefore for example also to effect the necessary correction on the measurement signal so that the remaining signal actually forms a reliable reproducible measurement in respect of the actual temperature of an object whose temperature is to be regulated.

Contact-less temperature sensors such as for example pyrometers have in that respect the advantage that they in turn do not have any influence at all on the temperature of the object whose temperature is to be regulated, and that on the other hand they detect the temperature values extremely rapidly and correspondingly rapid reactions for temperature correction purposes are possible.

In the case of conventional temperature measurement devices with a digital electronic system, the electronic system admittedly also has digital outputs, but for the purposes of further processing and temperature regulation the digital signals are again converted into an analog signal and the analog signal is then again fed to an external regulator. If that regulator is a digital regulator, and the present invention assumes that to be the case, then the signal applied to an analog input of that digital regulator is now digitized again and, in dependence on predetermined regulating parameters, on the basis of those parameters and the freshly digitized and possibly already corrected temperature values, a control signal or a control value is provided at an output of the regulator, which is mostly an analog output. In the simplest case for example a voltage which is proportional to the measured temperature is produced at the output of the digital regulator, and in turn can be used to raise or lower the voltage or current feed to a heating element which heats the object in question, more specifically inversely proportionally to the control value produced or however proportionally to the inverted control value.

It will be appreciated that it is also possible to implement substantially more complicated regulating systems and non-linear regulating processes.

In the conventional systems, analog transmission of a signal which has already been previously digitized and converted again into an analog signal, from the electronic measurement system of the temperature measurement device to a digital regulator with an analog input, occurs in particular for the reason that the digital interfaces of regulators and temperature measurement devices are mostly suitable only for parameterization and process visualization, by virtue of their limited transmission speed. Particularly in the case of rapid changes in temperature and with the requirement for rapid regulating procedures, the regulating speed which is to be achieved in this way is not sufficient so that an analog signal is transmitted from the electronic measurement system to the regulator, in order to increase the transmission speed.

BRIEF DESCRIPTION OF THE INVENTION

The present invention concerns an apparatus for contact-less temperature regulation comprising a suitable temperature measurement device which is accommodated in a housing, and a suitable electronic measurement system which operates at least in part digitally and which is also accommodated in the housing and which has an analog/digital converter for digitization of the analog measurement values and at least one analog output for further processing and use of an analog signal which is dependent on the measured temperature, and where the apparatus further has a digital regulator for producing a control value dependency on the measured temperature and predetermined parameters.

In the light of that state of the art, the object of the present invention is to provide a process and a corresponding apparatus for contact-less temperature regulation, which can have extremely short response times and which at the same time have a relatively high degree of accuracy and parameterizability.

In regard to the process as set forth in the opening part of this specification, that object is attained in that the data which are detected by the electronic measurement system and digitized for the first time are processed in one and the same processor for the purposes of temperature determination and regulation, which is integrated in the electronic measurement system or the housing of the electronic measurement system, so that the raw data are used within the processor both for ascertaining the current temperature and also for calculating and producing a control value, and thus the output of the electronic measurement system in the form of the regulator output directly provides a control value for influencing the temperature to be regulated of an object.

More particularly, the process of the invention includes the steps of detecting the temperature of the object using a contact-less temperature measurement unit that outputs an analog signal proportional to the temperature; digitizing the analog signal to obtain a digitized signal; processing the digitized signal in conjunction with predetermined regulating parameters within a digital regulator to obtain a temperature value; processing the temperature value using said digital processor within said digital regulator to obtain a control value; and outputting the control value to a means for regulating the temperature of the article.

In regard to the apparatus as set forth in the opening part of this specification the object of the invention is attained in that the digital regulator is integrated directly into the digital portion of the temperature measurement device so that the at least one analog output of the temperature measurement device is an analog output of the digital regulator.

Preferably, the temperature measurement device or the electronic measurement system also has a further analog output whose signal is a measurement in respect of the current temperature.

In that way, the favorable properties of digital regulators, more specifically a high level of accuracy, parameterizability, remote maintenance and remote diagnosis, are advantageously linked with the high-speed analog measurement process. By virtue of the elimination of additional digital-analog and analog-digital conversion steps, the regulator or the electronic measurement system has a shorter reaction time, while in addition there is an improvement in the level of accuracy of the detected temperature values which are used for the regulation procedure, so that the regulation procedure can also be implemented in a correspondingly more accurate fashion.

In particular however the operation of determining the current temperature takes place on or in the same microprocessor which also executes calculation of the control value on the basis of predeterminable parameters. It is possible in that way to drastically curtail the reaction time of the regulator as there is no need for any further conversion operations in respect of the data in digital/analog terms or any more conversion, and as all 'on-chip' procedures, because of the relatively short and optimized transit paths on the microprocessor, basically take place more rapidly than is possible with various interposed interfaces.

BRIEF DESCRIPTION OF THE DRAWING

The drawing is a diagrammatical representation of an embodiment of the apparatus of the invention.

DETAILED DESCRIPTION OF THE INVENTION

More particularly, the apparatus of the invention includes apparatus for detecting the temperature of the object using a contact-less temperature measurement unit that outputs an analog signal proportional to the temperature; apparatus for digitizing the analog signal to obtain a digitized signal; apparatus comprising a digital processor for processing the digitized signal in conjunction with predetermined regulating parameters to obtain a temperature value; apparatus for processing the temperature value using said digital processor to obtain a control value; and apparatus for outputting the control value to a means for regulating the temperature of the article.

In a preferred embodiment of the invention the temperature measurement device used is a pyrometer, that is to say the apparatus in question has a pyrometer as the contact-less temperature measurement unit, as well as a corresponding electronic system. Basically all regulators and regulating processes known in the state of the art can be used for a regulator in accordance with the present invention. Typical examples are so-called two-point regulators, that is to say regulator and regulating processes in which an upper and a lower limit value for a temperature is fixed, while a correction, that is to say an increase in the heating power is effected when the temperature falls below the lower limit value and throttling of the heating power or a cooling action is effected when the upper limit value is exceeded. When the temperature is in the range between the two limit values, the control value does not initiate any change in the heating or cooling power.

Another known regulating process is the so-called PID-process (in which respect the abbreviation PID stands for proportional-integral-differential). In that case the proportional portion reacts to relative or also absolute deviations in respect of the current temperature value from the measured temperature value, the integral portion reacts to the sum or the integral of the deviations which have occurred hitherto and the differential portion reacts to the speed of a current temperature change. The control value is then afforded by adding up the three components which are also each multiplied by a variable factor, wherein those factors are the so-called regulating parameters.

A further regulating process which has become known in more recent times operates on the basis of the principle of so-called fuzzy logic.

Not only does direct further processing of the measured and digitized data in a regulator contribute to accurate temperature determination, but it is also possible to add the detection of radiation in at least two different spectral ranges, in which respect the temperature measurement device must accordingly have sensors which are sensitive for at least those two spectral ranges.

The regulators may in particular also have a programmable microprocessor with a memory into which the desired regulating parameters can be inputted. In addition the microprocessor can be programmed in such a way that it ascertains or optimizes regulating parameters themselves from measured temperature configurations and patterns. Optimization can also be effected solely on the basis of external inputs. In that respect, renewed optimization and calculation of parameters can also be initiated automatically when predeterminable conditions occur.

When using a pyrometer the measured temperature radiation can be detected by means of an optical lens system provided on the housing of the pyrometer, or alternatively it is also possible to provide an optical fiber system.

Further advantages and possible uses of the present invention will be apparent from the drawing described hereinafter.

In the drawing, diagrammatically indicated at the left-hand edge of the FIGURE is a surface or plate 1 whose temperature is to be regulated. The plate 1 can be heated up for example by a laser which causes very rapid changes in temperature. In order therefore to be able to appropriately regulate a corresponding heating action or corresponding heating pulses, very rapid temperature detection and the output of a corresponding regulating parameter is required.

In accordance with the invention that is effected in that the radiation issuing from the plate 1 is focused on to the detector 3 in a housing 11 by means of an optical system 2. The detector 3 supplies, in proportion to the intensity of the received radiation, an analog signal which is applied to an analog-digital converter 4. The output of the analog-digital converter 4 is connected to a microprocessor 5 which is a programmable microprocessor. A temperature of the object 1 is calculated in the microprocessor 5, from the received digital values, in which respect all required corrections, on the basis of external radiation influences, are possibly also implemented. Furthermore, the measured temperature which is determined in that way is compared to a reference temperature value in the same microprocessor. In dependence on the difference between the reference temperature value and the actual temperature value and possibly also other parameters arising out of the comparison (for example integral and differential portions), a control value is applied in digitized form to the digital-analog converter 8. At its output the converter 8 generates an analog voltage or current signal which serves as a control value for heating devices, for example for laser control, in order to correct the measured temperature value.

The parameters which are to be used for measurement and regulation can be inputted into the microprocessor by way of a digital interface 7. Likewise the microprocessor can output the predetermined or stored parameter values which have possibly been freshly calculated and optimized. Reference 6 denotes a power supply. All signal, parameter and power supply feed lines are taken out of the housing 11 by way of a central plug 10. As will be seen, the digital regulator in the form of the microprocessor 5 and the digital-analog converter 8 is integrated into the housing so that the temperature measurement unit can also be used at the same time as a temperature regulator.

What is claimed is:

1. A process for contact-less temperature regulation of an object which comprises:
    detecting raw data related to the temperature of the object using an optical detector in a housing;
    digitizing the raw detected data to obtain digitized data using an analog to digital (A/D) converter in the housing where the A/D converter is located proximate the optical detector;
    processing the digitized data within a digital microprocessor within the housing to obtain a temperature value where the digital microprocessor is located proximate the A/D converter;
    processing the digitized data in conjunction with predetermined regulating parameters to obtain a control value using said same digital processor within said digital regulator; and
    outputting the control value to a means for regulating the temperature of the article.

2. A process according to claim 1 wherein the housing and components therein together comprise a pyrometer that outputs the control value to the means for regulating the temperature.

3. A process according to claim 1 wherein the control value for varying the temperature changes when the temperature falls below a first limit value or exceeds a second limit value.

4. A process according to claim 2 wherein the control value for varying the temperature changes when the temperature falls below a first limit value or exceeds a second limit value.

5. A process according to claim 1 wherein regulation is effected in accordance with the PID-process (proportional-integral-differential) process.

6. A process according to claim 2 wherein regulation is effected in accordance with the PID-process (proportional-integral-differential) process.

7. A process according to claim 1 wherein regulation is effected on the basis of fuzzy logic principles.

8. A process according to claim 2 wherein regulation is effected on the basis of fuzzy logic principles.

9. A process according to claim 1 wherein radiation from the object whose temperature is to be measured is detected in at least two different spectral ranges to obtain detected data.

10. A process according to claim 1 wherein regulating parameters are automatically optimized on the basis of detected data patterns and stored.

11. A process according to claim 10 wherein fresh optimization and storage of regulating parameters is effected when predetermined conditions occur.

12. Apparatus for contact-less temperature regulation comprising:
    a) a housing;
    b) an optical detector in the housing for detecting raw data related to the temperature of an object without contacting the object;
    c) an analog/digital (A/D) converter in the housing for digitization of the raw data to obtain digitized data, said A/D converter being proximate the optical detector; and
    d) a digital microprocessor within the housing proximate the A/D converter for producing a temperature value using the digitized data and for producing a control value in dependence on the digitized data and adjustable regulating parameters.

13. Apparatus for contact-less temperature regulation according to claim 12 wherein the apparatus is a pyrometer that outputs the control value to means for regulating temperature of the object and displays the temperature of the object.

14. Apparatus for contact-less temperature regulation according to claim 12 wherein the digital regulator is in the form of a two-point regulator, a PID-regulator or a fuzzy logic regulator.

15. Apparatus for contact-less temperature regulation according to claim 13 wherein the digital regulator is in the form of a two-point regulator, a PID-regulator or a fuzzy logic regulator.

16. Apparatus according to claim 12 wherein the optical detector comprises and optical lens system for detecting thermal radiation from said object.

17. Apparatus according to claim 12 wherein the optical detector comprises an optical fiber system for detection of thermal radiation from the object.

18. Apparatus according to claim 12 wherein the optical detector has sensors for detection of the thermal radiation in at least two different spectral ranges.

19. Apparatus according to claim 12 wherein the optical detector has an analog output whose signal corresponds to measured temperature.

20. An apparatus for contact-less temperature regulation of an object which comprises:
    a housing;
    means for detecting raw data related to the temperature of the object using a contact-less optical detector;
    means in the housing for first digitizing the raw data to obtain digitized data;
    means in the housing proximate the means for digitizing comprising a digital microprocessor for processing the digitized data in conjunction with predetermined regulating parameters to obtain a control value;
    means for processing the digitized data using said digital microprocessor to obtain a temperature value; and
    means for outputting the control value to a means for regulating the temperature of the article.

* * * * *